Patented Apr. 15, 1924.

1,490,204

UNITED STATES PATENT OFFICE.

RUFUS N. CHAMBERLAIN, OF CHICAGO, ILLINOIS, ASSIGNOR TO GOULD STORAGE BATTERY COMPANY, OF NEW YORK, N. Y., A CORPORATION OF NEW YORK.

SEPARATOR AND PROCESS OF TREATING THE SAME.

No Drawing. Application filed March 2, 1921. Serial No. 449,173.

*To all whom it may concern:*

Be it known that I, RUFUS N. CHAMBERLAIN, a citizen of the United States, residing at Chicago, in the county of Cook, State of Illinois, have invented a new and useful Improvement in Separators and Processes of Treating the Same, of which the following is a full, clear, and exact description.

My invention relates to storage battery separators and the process of treating the same. My invention relates particularly to separators having a fibrous structure and a process of treating such separators so as to prolong the life thereof and increase the efficiency of such separators and the batteries in which they are placed.

By the use of my invention efficient separators are produced which may be thinner than ordinarily used and which are also efficient in maintaining the plates in position and which also act to increase the life of the battery. My invention is applicable to any material which is of a fibrous nature and has normally sufficient porosity for use as a separator. This requirement varies somewhat with the various uses to which the battery, equipped with the separator, is to be put.

My invention is especially useful on separators for use on batteries normally having an electrolyte of high specific gravity and which are also subject to high temperature of the electrolyte during the normal use of the battery. This condition is ordinarily found in batteries used for self-starting purposes in automobiles and other similar uses.

In order to retard the destructive effect on the fibers of such separators due to the above mentioned conditions, a protective coating or film is applied to the fibers without, however, appreciably decreasing the natural porosity of the structure used as a separator.

I have found that the benefits above outlined are secured by treating a separator with linseed oil. One method which I have found satisfactory is to dissolve the linseed oil in a suitable solvent such as benzol or turpentine, or any other solvent which may be readily evaporated. The separators are then immersed in said solution, or they may be first placed in a vacuum apparatus and, after a suitable vacuum has been obtained, the linseed oil solution is admitted, the vacuum being maintained until the solution rises above the separators, the purpose being to completely saturate the separators throughout their fibrous structure with the solution. After the separators have been thoroughly saturated or permeated with the solution, they are taken out and allowed to drain or the excess solution otherwise removed and then the separators are exposed to some drying agent, such as the atmosphere, so as to evaporate the solvent.

By reason of the use of a suitable solvent, a complete saturation of the interior fibrous structure of the separators is effected and by reason of this solvent the particles of the protective substance such as linseed oil, are deposited more or less uniformly throughout the entire interior of the separators, thus protecting the interior structure against the action of the acid.

I prefer to use a 20% to 30% solution, although a much weaker or stronger solution may be used, depending upon the character of service to which the battery containing the separator is to be put.

The separators which are provided with a protection of the linseed oil have many of the desirable qualities above set forth and may be used without further treatment. I have found, however, that the benefits are increased by giving the separators the following further treatment, that is to say, they are placed in a warm current of air or other medium which acts to oxidize the linseed oil in situ on the fibres of the separators, thus forming an insoluble compound generally known as lynoxin. This protective lynoxin very greatly increases the life of the fibres in the separator on account of its being more or less inert to acid and also because it is relatively insoluble. By reason of the use of a solvent which renders it possible to deposit the particles of oil throughout the interior structure of the separator, the coating or film on the fibres is exceedingly thin, therefore the porosity of the separator is not materially changed from that of its natural or normal porosity. This will be appreciated when it is considered that 70% to 80% of the solution is composed of the solvent which is removed in liquid state or which is evaporated leaving only 20% or 30% of the solution inside the separator. This solution, as above suggested, may be even less than 20% if it is found that the service of the battery does not require the protection secured from a stronger solution. The separator may even be subjected to full solution of the protective material when its conductivity is of secondary importance.

It has been found that batteries containing separators as heretofore treated, must be subjected to several charges and discharges before the voltage and capacity of the battery are up to normal. This is due principally to the fact that the separators at first are not sufficiently conductive to permit a full capacity current at normal voltage and are rendered conductive by the charges and discharges which vary, depending upon the nature of the separator.

I have discovered that full capacity may be secured from a battery upon the first discharge if the separators are subjected to the following treatment before being placed in the battery. This treatment consists in placing the separators into a liquid, preferably water, and raising the temperature of the liquid to about 200° Fahrenheit. The separators are then allowed to cool in the same bath down to normal room temperature, or to about 70° Fahrenheit, or they may be transferred immediately into a cold bath and chilled to about room temperature. This heat treatment, in my opinion, removes the air or other gases from the interior of the separator and therefore allows a complete saturation of the separator with the liquid. I have found in practice that with such a treatment the separators, when cooled, immediately sink in the liquid. This, I think, is due to the fact that there is such a complete saturation of the separators as to remove all of the gaseous content which normally acts to float the separators. It is important that in this treatment the separators be kept out of free contact with the air or any other gaseous medium and preferably they should be kept in a liquid so that the effect of the heat in driving off the gases will not be lost by subsequent exposure to a gaseous medium. Furthermore, the cooling of the separators in a liquid causes the spaces which are normally occupied by a gaseous substance to be filled with the liquid due to the contraction of the slight amount of remaining gas inside the separator, thus tending to create a vacuum and by reason of the presence of the liquid it is drawn into these small interior passages or chambers and completely saturates the separator. It is important also, that the separators be kept out of contact with a gaseous medium until in position in the electrolyte in the battery so that they may not at any time subsequent to the heat treatment have an opportunity to allow the liquid, which has thoroughly permeated the separator, to be replaced by a gaseous substance.

Separators which have been treated as above described, when placed in the electrolyte have substantially their final conductivity immediately and I have found that they give a substantially normal discharge rate at the very beginning of their life. This treatment has the benefit and advantage of avoiding the necessity of receiving preliminary charges and discharges of the battery in order to bring it up to the normal rate.

The heat treatment above described is applicable to any separator, whether that separator has been first subjected to a protective treatment or not, but has a special beneficial effect on treated separators on account of the unavoidable slight effect on the porosity of the separators.

After the heat treatment above described, it is not necessary that the separators should be kept immersed in liquid in order to maintain the benefits obtained by such treatment but they may be kept wet or damp, the benefits being secured in any case where the separator has not been permitted to completely dry after being treated.

My invention as above described has many advantages, among which are, that the separator has a longer life; is more efficient; may be thinner, resulting in a more compact battery; avoids the necessity of several charges and discharges with a battery or a long period of storing of the separators in the electrolyte and many other advantages result from batteries put to special uses.

The details of some of the steps in the treatment above given may be changed or varied without departing from the spirit of my invention and other slight variations in the carrying out of the process above set forth may be made and many benefits of my invention secured without departing from the process hereinabove described.

I claim:

1. The process of treating a separator consisting in saturating said separator with linseed oil.

2. The process of treating a separator consisting in saturating said separator with linseed oil and removing the excess oil and oxidizing a film of said oil on the fibres of said separator.

3. The process of treating a separator which consists in impregnating said separator with a solution of linseed oil, and evaporating the solvent.

4. The process which consists in subjecting a fibrous article to linseed oil in solution and removing the solvent.

5. The process of treating separators which consists in placing linseed oil in solution, impregnating said separators therewith and removing said solvent.

6. The process of treating wood separators which consists in subjecting said separators to a thin solution of linseed oil and removing the solvent.

7. The process of treating wood separators which consists in impregnating the separators with linseed oil dissolved in benzol and removing the benzol.

8. The process which consists in subjecting a fibrous article to linseed oil in solution and removing the solvent and oxidizing the oil.

9. The process which consists in applying a protective substance to the fibres of an article by bringing said substance onto said fibres and rendering the substance substantially insoluble in acid.

10. The process of applying a protective substance to the fibres of a separator which consists in subjecting said fibres to said substance while dissolved in a thin penetrating solvent, removing the solvent and treating the substance in situ to render it less soluble in the electrolyte.

11. The process of treating separators which consists in placing linseed oil in solution, impregnating said separators therewith, removing the solvent and treating the deposit to render it less soluble in the electrolyte.

12. The process of treating wood separators which consists in subjecting said separators to a thin solution of linseed oil, removing the solvent and oxidizing the oil.

13. The process of treating wood separators which consists in impregnating the separators with linseed oil dissolved in benzol, removing the benzol and oxidizing the oil.

14. A fibrous separator having its fibres protected by an oil.

15. A fibrous separator having its fibres protected by linseed oil.

16. A fibrous separator having its fibres protecetd by an oxidized oil product.

17. A fibrous separator having its fibres protected by oxidized linseed oil.

18. The process of treating fibrous articles which consists in heating said articles to a high temperature and cooling same while out of contact with a gaseous medium.

19. The process of treating fibrous articles which consists in heating said articles to a high temperature in a liquid and cooling same while wet.

20. The process of treating fibrous articles which consists in exposing said articles to water at about 200° F., and cooling said articles while in water.

21. The process which consists in protecting the fibres of an article with a substance inert to acid, raising said article to a high temperature in the presence of a liquid and cooling said article out of free contact with a gaseous medium.

22. The process which consists in protecting the fibres of a separator with an acid resistant material, subjecting said separator to a high temperature and cooling said separator while wet.

23. The process which consists in protecting the fibres of a separator with an acid resistant material, then raising said separator to a high temperature and chilling said separator while out of contact with a gaseous medium.

24. The process of treating separators which consists in placing acid resistant material in solution, impregnating said separators therewith, removing the solvent and subjecting said separators to a high temperature and to a low temperature while wet.

25. The process of treating wood separators which consists in subjecting said separators to a thin solution of acid resistant material, removing the solvent and subjecting said separators to a high and to a low temperature in a liquid.

26. The process of treating wood separators which consists in impregnating the separators with linseed oil dissolved in benzol, removing the benzol and subjecting said separators to a high and to a low temperature in a liquid.

27. The process which consists in subjecting a fibrous article to linseed oil in solution, removing the solvent, oxidizing the oil and subjecting said separator to a high and to a low temperature in a liquid.

28. The process which consists in applying a protective substance to the fibres of an article by bringing said substance onto said fibres while in solution, removing the solvent, and subjecting said article to a high and a low temperature in a liquid.

29. The process of applying a protective substance to the fibre of a separator which consists in subjecting said fibres to said substance while dissolved in a thin penetrating solvent, removing the solvent, oxidizing the protective substance and subjecting said separator to a high temperature and to a low temperature while wet.

30. The process of treating separators which consists in placing linseed oil in solution, impregnating said separators therewith, removing the solvent, oxidizing the oil and subjecting said separators to a high and to a low temperature in a liquid.

31. The process of treating wood separators which consists in subjecting said separators to a thin solution of linseed oil, removing the solvent, and subjecting said separators to a high and to a low temperature in a liquid.

32. The process of treating wood separators which consists in impregnating the separators with linseed oil dissolved in benzol, removing the benzol, oxidizing the oil, and subjecting said separators to a high and to a low temperature in a liquid.

In testimony whereof, I have hereunto set my hand.

RUFUS N. CHAMBERLAIN.